United States Patent Office 2,910,197
Patented Oct. 27, 1959

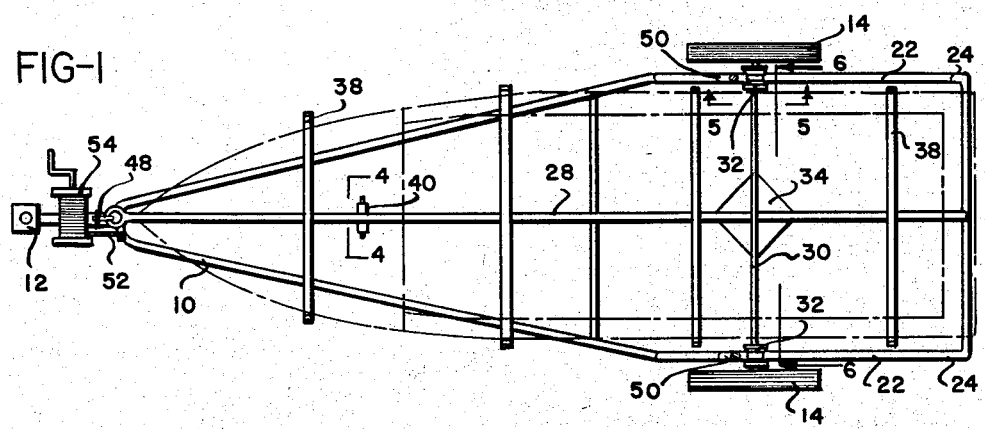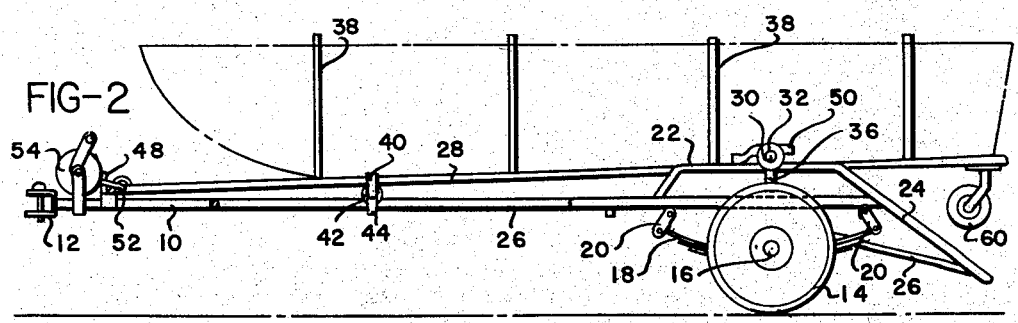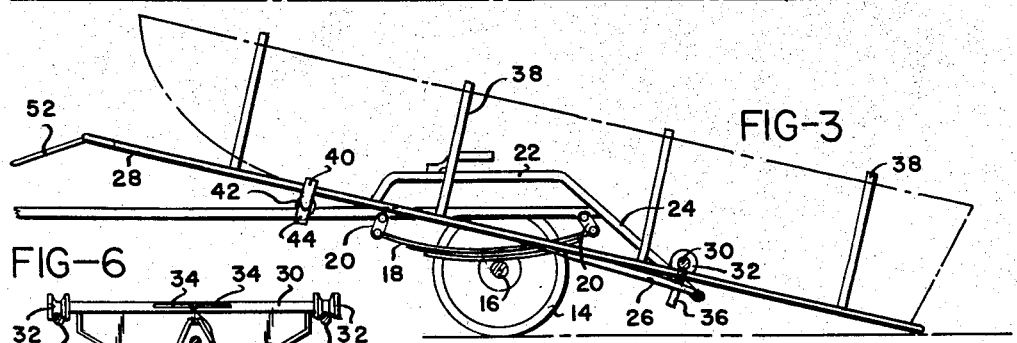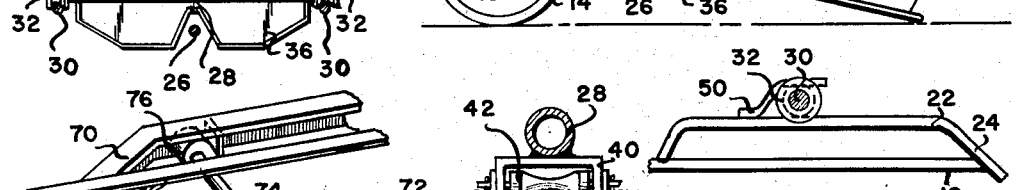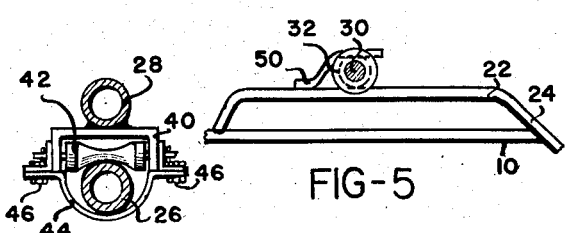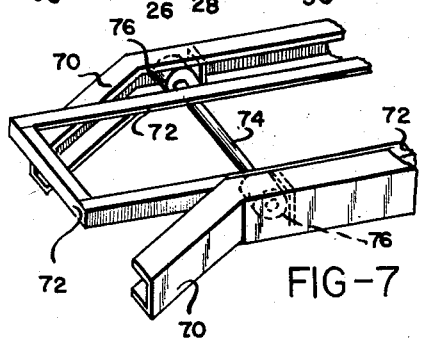

2,910,197

BOAT TRAILER

Elias W. Beckner, Arcanum, Ohio

Application March 27, 1957, Serial No. 648,938

3 Claims. (Cl. 214—84)

This invention relates to boat trailers and in particular to a boat trailer that is more convenient to utilize than conventional boat trailers.

Most trailer arrangements for carrying boats are of a type that must be backed downwardly usually with the rear wheels in the water and thereafter the boat is slid off into the water or is pulled up from out of the water on to the trailer. The launching of a boat from a trailer is not usually too difficult but a great deal of difficulty is occasioned in getting the boat on to the trailer, particularly where the boat is of considerable size and weight.

The present invention has as a particular objective the provision of a boat trailer in which the difficulties referred to above are eliminated.

Another objective of the present invention is the provision of a boat trailer in which most of the heavy lifting work in connection with getting the boat on and off the trailer is eliminated.

A still further objective of this invention is the provision of a boat trailer which is relatively light and which is inexpensive to manufacture.

A still further object of this invention is the provision of a boat trailer in which the boat is carried by a frame movable on the trailer frame but which movable frame is tightly fixed in position on the trailer frame while the boat is being transported.

The foregoing objects as well as still other objects and advantages will become more apparent upon reference to the drawings in which:

Figure 1 is a plan view looking down on top of a boat trailer constructed according to my invention;

Figure 2 is a side elevation of the boat trailer showing the boat in transport position;

Figure 3 is a fragmentary view showing the movable frame of the trailer in position for discharging or receiving the boat;

Figure 4 is a sectional view indicated by line 4—4 on Figure 1 showing a connection between the movable frame and the trailer frame;

Figure 5 is a sectional view indicated by line 5—5 on Figure 1 showing a hold down member that holds the movable frame in place when it is in transport position on the trailer frame;

Figure 6 is a sectional view indicated by line 6—6 on Figure 1 showing a manner in which the transverse member of the movable frame that carries the rolls can be braced, and Figure 7 is a fragmentary perspective view showing another manner in which the movable frame can be mounted in the trailer frame.

Referring to the drawings somewhat more in detail, the main frame of the trailer which is carried on supporting wheels and which is connected to the towing vehicle comprises a tubular frame portion 10 having at its forward end a hitch element 12 for connection of the trailer with a vehicle such as an automobile or truck while at the rear end of the frame 10 the supporting wheels 14 are mounted on a transverse axle 16 that supports the trailer by means of springs 18 and spring hangers 20.

The tubular frame 10 comprises upstanding track portions 22 which may be welded to the side rails of frame 10 and which extend parallel with the side rails of the frame but in vertically spaced relation thereto in the region of wheels 14 and then rearwardly of wheels 14 the track portions 22 bend downwardly as at 24 and are interconnected at their lower ends to form a closed and thus relatively strong structure. There may advantageously be provided a central brace member 26 extending upwardly from the center of the inter-connected member at the rear ends of tracks 24 to the main part of the trailer frame whereby the trailer frame and the track portions are capable of supporting heavy loads.

The movable frame part of the trailer consists of a longitudinally extending tubular rib 28 which has secured thereto and extending transversely an axle structure 30 that has rollers 32 on its opposite ends engaging the track portions 22. Axle structure 30 may advantageously be braced on central rib 28 as by means of gusset members 34 located at the inter-section of the axle and rib members, there also being a transversely extending stiffening plate 36 extending transversely along the bottom of the axle structure. The stiffening plate 36 and the axle and the rib 28 and the gussets 34 may all be welded together to form a single integral unit.

The central rib 28 is adapted for receiving the boat supporting members 38 which may be shaped according to the particular boat that is to be carried on the boat trailer. These members provide adequate points of support spaced along the length and width of the boat so that extreme stresses are not built up within the boat while at the same time can be transported safely over a long distance.

The central rib 28 toward the front end has secured thereto a bracket 40 in which is mounted a roller 42 that rides on the top of the longitudinally extending center brace member of the trailer frame. This member is a continuation of the brace member 26 previously referred to and extends the full length of the trailer frame.

Bracket 40 is formed so that a strap 44 may be secured thereto as by bolts 46 so that the movable frame is held in position on the main frame of the trailer but is movable longitudinally thereof.

When the movable frame of the trailer is in its Figures 1 and 2 position there is a latch member 48 carried by the main trailer frame adapted for engaging the movable frame thereby to lock the movable frame on the trailer frame against relative longitudinal movement therebetween.

Also, when the trailer frame is in its Figures 1 and 2 position, hold down members 50 attached to the track portions 22 engage over the tops of rollers 32 or over some portion of the axle structure supporting the said rollers so that the movable frame is held on the trailer frame against vertical movement whereby the movable frame will neither bounce on the trailer frame or move longitudinally thereof during transport.

When it is desired to remove the boat from the trailer, or to back up a boat thereon, the latch 48 is released and the movable frame is pushed backwardly from its Figure 2 position into its Figure 3 position. At this time the movable frame tilts downwardly because the rollers 32 follow the inclined portions 24 of the tracks and this brings the rear end of the movable frame down adjacent or even into the water so that the bottom may readily be pulled from the movable frame or pulled from the water on to the movable frame.

In order to facilitate pulling of the movable frame up into its transport position, it may have connected therewith a cable 52 leading to a winch mechanism 54 carried by the main frame of the trailer adjacent hinge 12. The provision of the winch and cable reduces the manual labor in connection with loading a boat to a minimum and also provides an additional safety feature against the movable frame sliding backward on the main frame when in transport if the winch is provided with a suitable locking mechanism.

It has been mentioned previously that the strap 44 bolts to frame 40 by bolts 46 and this feature may be availed of to advantage on occasion should it be desired to remove the movable frame from the main trailer frame for any reason such as to provide some means for moving the boat about on dry land. With this in mind, the movable frame may be provided with wheels 60 at its rear end which can be utilized to convert the movable frame into a sort of wheel barrow carrying device if so desired. Such an arrangement might be useful for moving the boat to a repair shop or for getting the boat to and from the water in places where the towing vehicle must remain some distance away. Such wheels, of course, could be detached, and in any case, would not interfere with the conventional operation of the trailer according to the present invention.

The trailer frame and the movable frame thereon have been illustrated and described as being tubular and this is the preferred construction since such frames are light and inexpensive and easy to fabricate. However, it might, for extremely heavy jobs, be preferred to form the main trailer, and possibly the boat trailer, out of either heavy channels or angles, and such an arrangement, embodying the teaching of the present invention is illustrated in Figure 7 wherein the main frame comprises inwardly opening side channels 70 and the movable frame comprises angles 72 carrying axle 74 that supports rollers 76 located within the channels 70 and guided thereby so that the movable frame will move backwardly and downwardly from its transport to its loading and unloading position.

In either case it will be evident that the trailer need not be unhitched from the vehicle for loading and unloading purposes but the reciprocating tilting movable frame accomplishes substantially the same result and in addition, enables a part of the trailer to extend much farther into the water than is usually the case.

In connection with the strength developed by a boat carrying trailer as shown in Figures 1 through 3, it will be noted that the rollers 32 are positioned directly over axle 16 when the movable frame is in transport position. In this position the load of the boat bears directly downwardly over axle 16 and is, furthermore, imposed on the strongest part of the trailer frame since at that time part of the trailer consists of the side members of the trailer frame and the track portions spaced therefrom and which track portions are welded to the trailer frame, on opposite sides of the supporting wheels. The supporting wheels, in turn, are connected with the trailer frame by way of the springs 18 and spring hangers 20 that are attached to the trailer frame adjacent the points of connection of the trailer frame with the track portions 22. The entire arrangement is thus extremely rigid and the elements of the combination are interconnected so as to transmit loads therebetween advantageously.

The supports 38 for the boat may, if it is desired, be of a detachable nature so that different sizes and shapes of boats can be accommodated on one and the same basic trailer. It will be evident however, that the particular shape and construction of these elements is not particularly important to the basic features of a trailer according to this present invention.

I claim:

1. In a boat trailer; a main frame having supporting wheels in the region of the rear end and having a hitch structure at the front end, an auxiliary frame carried by the main frame, said auxiliary frame comprising boat supporting members, a central longitudinally extending rib on which the members are carried, a transversely extending axle member on the auxiliary frame in the region of the rear wheels of the main frame, said main frame having a central longitudinal member and side rails, the space between the side rails being unobstructed toward the rear of the main frame, said side rails having horizontal portions in the region of the rear wheels elevated above the plane of the main frame and said side rails then extending downwardly at an angle rearwardly of the rear wheels, there being roller means on the ends of the axle structure of the auxiliary frame engaging the said side rails and means on the said rib slidably embracing the said longitudinal member but detachable therefrom, and means carried by the said elevated portions of the side rails for clamping the auxiliary frame thereto when the auxiliary frame is located in its forwardmost position on the main frame, said last mentioned means including means on the side rails engaging the tops of the rollers on the auxiliary frame.

2. In a boat trailer; a main frame having supporting wheels in the region of the rear end and having a hitch structure at the front end, an auxiliary frame carried by the main frame, said auxiliary frame comprising boat supporting members and a longitudinal extending rib on which the members are carried, said auxiliary frame having a transversely extending axle member positioned in the region of the rear wheels of the main frame when the auxiliary frame is in its forward position on the main frame, said main frame having a central longitudinal member and side rails rigidly interconnected, said side rails having horizontal portions in the region of the rear wheels elevated above the plane of the main frame, said portions extending downwardly at an angle rearwardly of the rear wheels, the space between the side rails toward the rear of the main frame being unobstructed, there being roller means on the ends of the axle structure of the auxiliary frame engaging the said side rails and means on the said rib on the auxiliary frame detachably embracing the said longitudinal member, and means carried by the main frame for latching the auxiliary frame thereto when the auxiliary frame is located in its forwardmost position on the main frame, and said rollers on the ends of the structure being located substantially over the rear wheels of the main frame when the auxiliary frame is in its forward position, and angular elements fixed to the said elevated portions of the side rails of the main frame forming pockets opening rearwardly so as to engage the tops of the said rollers when the auxiliary frame is in its forward position.

3. In a boat trailer; a main frame having supporting wheels toward the rear and a hitch at the front to connect the main frame with a towing vehicle, said main frame comprising side rails having elevated portions above the supporting wheels defining tracks extending from in front of the wheels to the rear thereof, said portions then extending downwardly behind the wheels, the space between said portions being unobstructed, an auxiliary frame on the main frame having rollers engaging said portions so that rearward move of the auxiliary frame on the main frame will cause the auxiliary frame first to move backwardly and then to tilt downwardly at the back into the said space between the said portions, a member extending substantially longitudinally of said main frame in the center thereof and means on said auxiliary frame engaging said longitudinal extending means in the region of the front of said auxiliary frame for supporting and guiding the front end of the auxiliary frame in a substantially horizontal line along the main frame, the said means being disengageable from said member and the said rollers being disengageable from said track whereby the said frame can readily be separated from the main frame, said auxiliary frame being adapted for receiving supporting wheel means at its rear end, and said elevated portions of the side rails having angular elements fixed thereto forming rearwardly opening pockets so positioned as to receive said rollers when the auxiliary frame is in its forwardmost position on the main frame thereby to hold the auxiliary frame down on the main frame.

References Cited in the file of this patent

UNITED STATES PATENTS

| | | |
|---|---|---|
| 1,509,687 | Murphy | Sept. 23, 1924 |
| 2,512,798 | Hodges | June 27, 1950 |
| 2,529,752 | Whittle | Nov. 14, 1950 |
| 2,700,480 | Triplett | Jan. 25, 1955 |
| 2,711,259 | Jones | June 21, 1955 |